(12) United States Patent
Harmsma et al.

(10) Patent No.: US 9,651,429 B2
(45) Date of Patent: May 16, 2017

(54) OPTICAL MEASURING DEVICE

(75) Inventors: Peter Johan Harmsma, Delft (NL); Mirvais Yousefi, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 336 days.

(21) Appl. No.: 13/993,189

(22) PCT Filed: Dec. 21, 2011
(Under 37 CFR 1.47)

(86) PCT No.: PCT/NL2011/050883
§ 371 (c)(1),
(2), (4) Date: Nov. 22, 2013

(87) PCT Pub. No.: WO2012/087136
PCT Pub. Date: Jun. 28, 2012

(65) Prior Publication Data
US 2014/0300898 A1 Oct. 9, 2014

(30) Foreign Application Priority Data
Dec. 22, 2010 (EP) .................................. 10196436

(51) Int. Cl.
*G01J 9/02* (2006.01)
*G01J 3/18* (2006.01)
*G01J 9/00* (2006.01)

(52) U.S. Cl.
CPC ............ *G01J 9/0246* (2013.01); *G01J 3/1895* (2013.01); *G01J 9/00* (2013.01)

(58) Field of Classification Search
CPC .................................................... G01J 9/0246
See application file for complete search history.

(56) References Cited

U.S. PATENT DOCUMENTS

| 5,892,582 A | 4/1999 | Bao et al. |
| 6,097,487 A * | 8/2000 | Kringlebotn .......... G01J 9/0246 356/450 |

(Continued)

OTHER PUBLICATIONS

International Search Report—PCT/NL2011/050883—Date of mailing: Mar. 6, 2012.

(Continued)

Primary Examiner — Tarifur Chowdhury
Assistant Examiner — Omar Nixon
(74) Attorney, Agent, or Firm — Banner & Witcoff, Ltd.

(57) ABSTRACT

An optical measuring device measures a wavelength of a response from a sensing device. The optical measuring device contains a light path coupled to an interface for coupling the light path to the sensing device. A periodic optical filter has an input coupled to the light path, to sample light that is supplied to or received from the sensing device. A continuous output optical filter has an input coupled the light path to sample light that is supplied to or received from the sensing device. A computation circuit is coupled to detectors at the periodic optical filter and the continuous output optical filter. The computation circuit is programmed to process output signals from the detectors obtained during a wavelength scan. The processing involves quantization of data derived from the continuous filter wavelengths associated with respective time points at which the wavelength scan reaches corresponding positions in respective periods of the periodic optical filter. The processing computes a wavelength associated with the response of the sensing device from the identified wavelengths on the basis of a temporal relation between said respective time points and a time point of the response of the sensing device.

15 Claims, 5 Drawing Sheets

(56) References Cited

U.S. PATENT DOCUMENTS

| | | | |
|---|---|---|---|
| 7,333,680 B2* | 2/2008 | Yong | G01D 5/35303 250/205 |
| 2005/0134861 A1* | 6/2005 | Kringlebotn | G01J 3/28 356/480 |
| 2005/0269489 A1 | 12/2005 | Taverner | |
| 2006/0215167 A1* | 9/2006 | O'Gorman et al. | 356/454 |
| 2009/0073537 A1 | 3/2009 | Taverner | |

OTHER PUBLICATIONS

Y. Semenova. G. Farell. G. Rajan: "Fabry-Perot liquid crystal tunable filter for interrogation of multiple fibre Bragg grating sensors". Liquid Crystals and Applications in Optics. Proc. of SPIE. vol. 6587. Apr. 17, 2007 (Apr. 17, 2007).

Fallon R W et al: "All-fibre optical sensing system: Bragg grating sensor interrogated by a long-period grating". Measurement Science and Technology. IOP. Bristol. GB. vol. 9. No. 12. Dec. 1, 1998 (Dec. 1, 1998). pp. 1969-1973. XP020064657.

Y-J Rao: "In-fibre Bragg grating sensors". Measurement Science and Technology. IOP. Bristol. GB. vol. 8. No. 4. Apr. 1, 1997 (Apr. 1, 1997). pp. 355-375. XP002618866. ISSN: 0957-0233.

"Integrated-Optic Double-Ring Resonators with a Wide Free Soectral Range of 100 GHz" (S. Suzuki, K. Oda and Y. Hibino, Journal of Lightwave Technology, vol. 13, No. 8, Aug. 1995).

* cited by examiner

OPTICAL MEASURING DEVICE

CROSS-REFERENCE TO RELATED APPLICATIONS

This application is a U.S. National Stage application under 35 U.S.C. §371 of International Application PCT/NL2011/050883 (published as WO 2012/087136 A1), filed Dec. 21, 2011, which claims priority to Application EP 10196436.9, filed Dec. 22, 2010. Benefit of the filing date of each of these prior applications is hereby claimed. Each of these prior applications is hereby incorporated by reference in its entirety.

FIELD OF THE INVENTION

The invention relates to an optical measuring system, an optical measuring device for use in such a system and a method of operating an optical measuring system.

BACKGROUND

In optical measuring systems that provide for spectral measurements, i.e. measurement of optical properties as a function of optical wavelength or at one or more selected wavelengths, a wavelength calibration may be necessary. One example of such an optical measuring system uses a fibre Bragg based sensor device. Such a sensor device reflects light in the fibre, with wavelength dependent reflection properties that vary with external temperature. In order to use the fibre Bragg grating to measure physical parameters such as stress or absolute temperature, a measurement of the wavelength of the reflected light is needed.

One solution is the use of a tunable narrow band reference light source (a laser) and detection of the response as a function of tuning. However, the tuning range of such light source is often limited and widening the tuning range significantly increases costs. Moreover, the measurements can be disturbed if the light source suffers from mode hops. Another solution is to use broadband light and detection of the response using a monochromator. But the use of a monochromator significantly increases the cost of using simple sensor devices like fibre Bragg gratings. A monochromator is large and not robust to handling. A lower cost solution is the use of broadband light with a low cost tunable narrow band filter in the light path.

US Patent application 2004091002 discloses a method of tuning a filter wherein the resonance frequency of the filter is calibrated by means of two Fabry-Perot interferometers. Such interferometers act as comb filters that pass light only at a series of discrete wavelengths. In US2004091002 a first Fabry-Perot interferometer is dimensioned to provide relatively small differences between successive wavelengths of the comb filter and a second Fabry-Perot interferometer is dimensioned to provide larger differences between wavelengths of its comb filter. The second Fabry-Perot interferometer is combined with a filter to block light from all but one of these wavelengths. In US2004091002 the second Fabry-Perot interferometer is used to provide an absolute wavelength reference and the first Fabry-Perot interferometer is used to count the number of peaks of between the peak of the second Fabry-Perot interferometer and the actual frequency of the tuned filter.

In operation, light from a tunable filter (e.g. a laser cavity) is passed to the two Fabry-Perot interferometers, the resonance wavelength of the tunable filter is scanned. From the outputs of the Fabry-Perot interferometers it can be determined when the tunable filter is tuned to the second Fabry-Perot interferometer and how many peaks of the first Fabry-Perot interferometer have passed between tuning to the current resonance wavelength and tuning to the second Fabry-Perot interferometer. From this the current wavelength is determined.

U.S. Pat. No. 5,892,582 discloses a similar system, but with a fibre Bragg grating to perform the function of the combination of the second interferometer and the filter that blocks all but one wavelength. Both US2004091002 and U.S. Pat. No. 5,892,582 provide for solutions to determine wavelengths that can be implemented at low cost, or even integrated in a small optical device. It can be used to determine the wavelength of a laser that is tuned by means of a tunable filter. When the laser is tuned to a peak of the first Fabry Perot interferometer the wavelengths is known exactly. When the laser is tuned between peaks the wavelength can be estimated by interpolation, after measuring the amount of tuning needed to pass from one peak of the first Fabry Perot interferometer to the next.

However, this type of wavelength determination suffers from the problem that it cannot measure wavelengths when laser is used that suffers from mode hopping. Unfortunately many low cost lasers suffer from mode hopping, or start suffering from mode hops due to ageing. Mode hopping can have the effect that interpolation of the wavelength becomes useless. When mode hops across peaks of the first Fabry Perot interferometer occur, the count of peaks from the peak of the second Fabry Perot interferometer may even become erroneous.

SUMMARY

Among others, it is an object to provide for an optical measuring device that is robust against unpredictable wavelength jumps in a content of light that is supplied to a sensing device.

An optical measuring device according to claim 1 is provided. The device comprises a computation circuit, and a periodic optical filter and a continuous output optical filter that monitor light supplied to or from a sensing device. In operation the optical measuring device is coupled to a wavelength scannable light source such as a tunable laser and a sensing device, such as an optical fibre with a Bragg grating. The wavelength scannable light source and the sensing device may be part of the optical measuring device or they may be external components. In an embodiment the optical measuring device is an integrated optics device with all optical components of the optical measuring device integrated on a common substrate The computation circuit contains a program with instructions (or is otherwise configured) to cause it to process output signals from the first and second detector obtained during a wavelength scan of light supplied through the light path, to identify a wavelength associated with a response from the sensing device. The periodic optical filter is a filter with a wavelength dependent intensity transfer function that varies periodically as a function of wavelength, for example dependent on the number of wavelengths that fits in an optical path length, or path length difference in the periodic optical filter. The continuous output optical filter produces an output amplitude that does not become substantially zero over any finite range of wavelengths within the operational wavelength range of the optical measuring device. It may be based on an optical path length, or path length difference that is so short that no periods occur in the operational range.

The computation circuit processes output signals from the first and second detector obtained during a wavelength scan of light supplied through the light path, using quantization of data derived from the second detector to identify wavelengths associated with respective time points at which the wavelength scan reaches corresponding positions in respective periods of the periodic optical filter, and to compute a wavelength associated with the response of the sensing device from the identified wavelengths on the basis of a temporal relation between said respective time points and a time point of the response of the sensing device.

The computation circuit may for example compute a wavelength of a response of the sensing device from a count of periods detected by the first detector as a function between the detection time point of the response and a reference time point. The response may be a detected event such as the occurrence of a peak or a dip in a light reflection from the sensing device is detected for example. In this case the time point of the response is the time point at which the peak or dip is detected. But alternatively the response may simply be associated with a time point for which a measurement of the response from the sensing device is obtained.

The computation circuit may use the output of the continuous output optical filter to identify wavelengths associated with respective time points at which the wavelength scan reaches respective periods of the periodic optical filter, such as peak output values for example. The computation circuit quantizes data derived from the second detector in order to identify the wavelengths at these time points. This may be done for example by quantifying the output signal of the second detector, or counting periods during the scan and adding a quantized value of a detected steps in the output signal of the second detector, or a sum of such quantized values. Pairs of successive time points at which the wavelength scan reaches respective periods define time intervals that, in the absence of mode hops, correspond with scanning through periods in the periodic filter. The associated wavelength of the response from the sensor is identified from the identified wavelength of a time point at the edge of the time interval in which the response from the sensing device occurs.

In addition, time based interpolation from this time point at the edge of the time interval may be used to associate a more accurate wavelength with the response from the sensing device In an embodiment at least one step in the output of the second detector between the detection time point of the response and the reference time point. The computation circuit quantizes the step and corrects the count dependent on a number of quantization levels in the quantized value of the step. If more than one step is detected the correction may correspond to a sum of the quantized values of the steps. But alternatively measurements with more than one step (or more than a predetermined number of steps) may be invalidated. The quantization step size (the size of a range of values that is assigned to the same quantization level) preferably corresponds to the output change of the continuous output optical filter in one period of the periodic optical filter, but it may be somewhat smaller or larger without affecting the measurement.

In this way the optical measuring device allows for a wavelength calibration that is robust against wavelength hops of the light source, due, for example, to mode hops of a tunable laser.

In an embodiment the optical measuring device uses a long period resonant optical filter to select the reference time point. Alternatively a start time of a scan by the light source may be used to determine the reference time point for example, but a resonant optical filter provides a more stable reference. In an embodiment computation circuit determines a first and second number of steps in the output of the second detector between said detection time point and first and second time points of detecting the first and second resonance wavelengths by the third detector, and to select the first or second time points as the reference time point, according to whether the first or second number is smaller respectively. In this way the risk of errors is reduced. In an embodiment, measurement are marked a valid only when at least one of the numbers is zero.

In an embodiment the computation circuit performs a time based interpolation of the computed wavelength within periods of the periodic optical filter. This increases wavelength resolution. In an embodiment an interpolation coefficient is determined dependent on the detection of steps. This reduces the risk that wavelength hops affect the interpolation.

In an embodiment an N-way coupler and a corresponding array of detectors is used to detect the phase within the periods. In this way no interpolation is needed, so that errors due to interpolation are excluded.

An optical measuring device according to any one of the claims may also comprise said sensing device coupled to the interface. Many possible sensing devices may be used. In one embodiment a fibre Bragg grating is used.

A computer program product (such as a disk or semiconductor memory) is provided, comprising a program of instructions for a programmable processor that, when executed by the programmable processor will cause the programmable processor to receive a first response of a periodic optical filter to a first sample of light in a wavelength scan as a function of time;

use an output signal of the first detector to detect time points at which the scan reaches corresponding positions in respective periods of the periodic optical filter, pairs of successive time points defining successive time intervals;

receive a second response of a continuous output optical filter to a second sample of the light as a function of time;

use quantization of data derived from the second detector to identify wavelengths associated with the respective time points, compute a wavelength associated with the response of the sensing device from the identified wavelengths on the basis of a temporal relation between said respective time points and a time point of the response of the sensing device.

BRIEF DESCRIPTION OF THE DRAWING

These and other objects and advantageous aspects will become apparent from a description of exemplary embodiments that refers to the following figures.

DETAILED DESCRIPTION OF EXEMPLARY EMBODIMENTS

Figure 1:
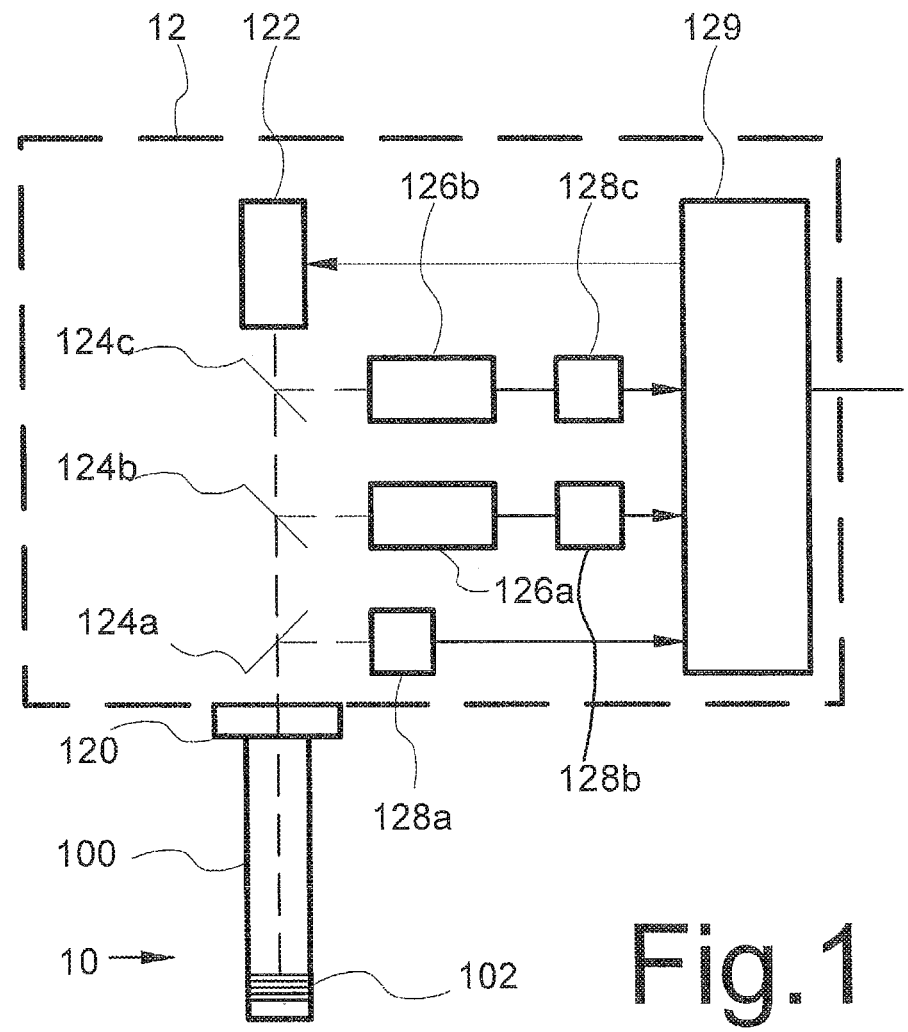
FIG. 1 shows an optical measuring system

FIG. 1 shows an example of an optical measuring system, comprising a sensing device 10 and a measuring device 12. Sensing device 10 comprises an optical fibre 100 with a fibre Bragg grating 102 in fibre 100. Fibre 100 is coupled to an optical terminal 120 of measuring device 12.

Measuring device 12 comprises a tunable laser 122, a first, second and third splitter 124a-c, a first and second filter 126a,b, a first, second and third light intensity detector 128a-c and a microcontroller 129 with a program memory 129a. Measuring device 12 may be an integrated optics device with all optical components of integrated on a common substrate, for example by means of waveguide structures on or in the substrate. Only simple optical components are needed that can readily be integrated.

First, second and third splitter 124a-c are located in the optical path from tunable laser 122 to optical terminal 120 and from there to optical fibre 100 and fibre Bragg grating 102 of sensing device 10. First splitter 124a has an input coupled to optical terminal 120 and an output coupled to first detector 128a. Instead of first splitter 124a a circulator may be used, which feeds light from tunable laser 122 to optical terminal 120, and from optical terminal 120 to first detector 128a. Second splitter 124b has an output path coupled to second detector 128b via first filter 126a. Third splitter 124c has an output path coupled to third detector 128c via second filter 126b. Although second and third splitter 124a,b are shown in a configuration wherein light is split off to the detectors on its way from tunable laser 122 to sensing device 10, it should be understood that instead they may split off light returned from sensing device 10 to the detectors. Microcontroller 129 has an output coupled to tunable laser 122 and inputs coupled to first, second and third detector 128a-c. Furthermore microcontroller 129 has an interface for outputting measurement data and optionally for receiving external measurements control commands.

In an embodiment first filter 126a is a comb filter, which transmits light substantially only at a series of discrete wavelengths. More generally first filter 126a may be any periodic filter, with a periodically wavelength dependent intensity transfer function that becomes zero at most at singular wavelengths. First filter 126a may be realized by means of an interferometer which splits incoming light and merges the split light after passing it through optical paths of mutually different length, or as a resonator wherein light passes repetitively through an optical path of a certain length. A Fabry-Perot interferometer may be used for example, wherein the optical path length is determined by distance between facing mirrors (including an input mirror that is transmissive to pass input light to the space between the mirrors, and an output mirror that transmits a small fraction of the light between the mirrors to an output). Another example comprises a ring resonator, with an optical wave guide that runs in a closed loop that defines the optical path length. In this case the filter may comprise input and output waveguides adjacent to the ring resonator, to couple light into and out of the ring resonator.

Second filter 126b is a filter that has a continuously variable output amplitude as a function of wavelength, i.e. an output amplitude that does not become substantially zero over any finite range of wavelengths, as would be the case with a comb filter, and has no local minima or maxima in its wavelength dependent intensity transfer function as a function of wavelength in the operational wavelength range. Second filter 126b may be realized by means of a low quality resonator structure for example. As is known per se, the "quality" of a resonator is the ratio between its bandwidth and its resonance wavelength. The quality can be reduced for example by increasing resonator losses, such as loss due to leakage from the optical path. In a Fabry-Perot interferometer-like interferometer for example, increasing transmissivity of the output mirror reduces quality.

In operation the wavelength of tunable laser 122 is scanned over a sweep range. First filter 16a is constructed to provide for a plurality of resonance peaks in the sweep range, for example at least ten resonance peaks, or at least fifty resonance peaks. This may be realized by selecting the optical path length L so that it is greater than $m/(1/L1-1/L2)$, wherein m is the desired number of peaks and L1 and L2 are the wavelengths at the bottom and top of the weep range. Second filter 126b preferably has no resonance peaks in the sweep range. When second filter 126b is realized using a low quality resonator its optical path length distance is selected to ensure this, its optical path length L' being less than $1/(1/L1-1/L2)$ for example. Hence, the optical path length of second filter 126b is smaller than that in the first filter 126a.

In operation light from tunable laser 122 is passed to first splitter 124a (or a circulator that may be used instead of first splitter 124a), via second and third splitter 124b,c. First splitter 124a directs light towards fibre Bragg grating 102. Fibre Bragg grating 102 reflects back light to first splitter 124a (or the circulator), which directs the reflected light to first detector 128a. Third splitter 124c directs a part of the light from tunable laser 122 to third detector 128c through second filter 126b. Second splitter 124a directs part of the light to second detector 128b through first filter 126a.

Microcontroller 129 transmits control signals to tunable laser 122 to make it sweep it wavelength over a range of wavelengths. During the sweep microcontroller 129 receives back time dependent detection signals form first, second and third detectors 128a-c.

Figure 2:
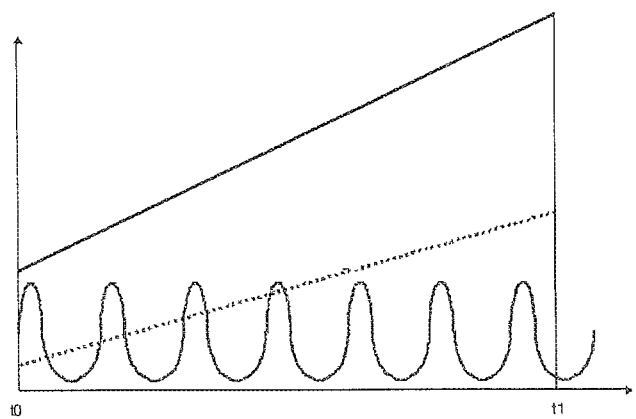
FIG. 2 illustrates detector signals

FIG. 2 shows the signals from second and third detectors 128a-c during the sweep. The signal from first detector 128a (not shown) contains a detection peak at a time point at which the wavelength of tunable laser 122 is tuned to fibre Bragg grating 102. The signal from second detector 128b contains a series of detection peaks at time points at which the wavelength of tunable laser 122 is tuned to wavelengths at which first filter 16a has transmission peaks. The signal from third detector 128c contains a continuously variable signal, dependent on the transmission of second filter 126b at the wavelength of tunable laser 122 at the time of detection.

Figure 3:
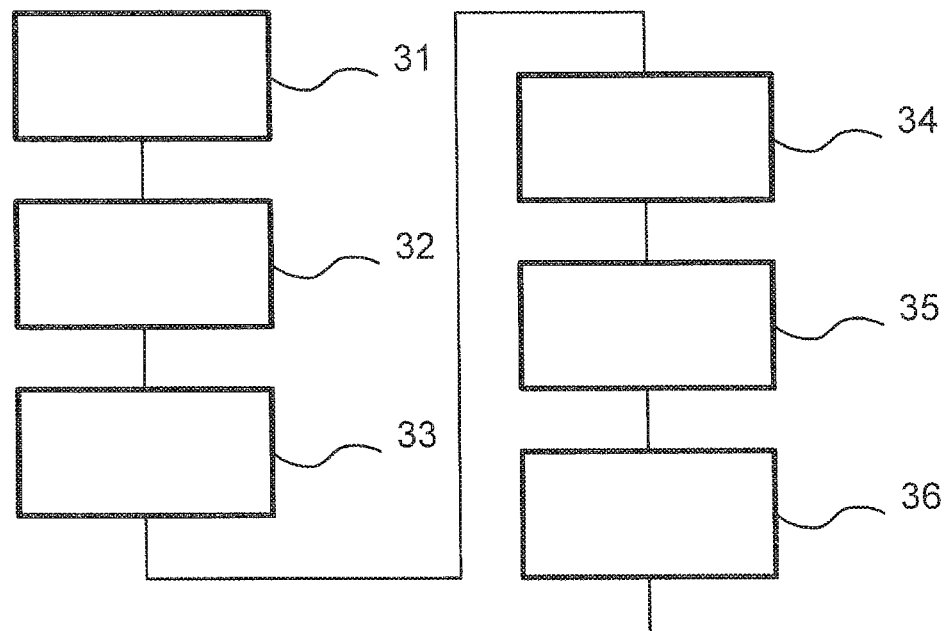
FIG. 3 shows a flow chart of operation of microcontroller 129.

FIG. 3 shows a flow chart of operation of microcontroller 129, wherein the wavelengths of a peak in the response from fibre Bragg grating 102 is detected. As will be understood, the flow-chart may be taken as a description of the components of a program of instructions of the microcontroller 129 in the embodiment where the operation is performed with a programmable microcontroller.

In a first step 31 microcontroller 129 transmits control signals to tunable laser 122 to make it sweep it wavelength over a range of wavelengths and microcontroller 129 captures time dependent output signals from detectors 126a-c. By way of example an embodiment will be described wherein the output signals are recorded and processed afterwards, but it should be appreciated that the output signals may be processed during the sweep. This would require a modification that operations from a plurality of the described steps need to be performed repeatedly during the sweep.

In a second step 32 microcontroller 129 processes the detection signal from first detector 128, to detect whether this detection signal contains a peak and to detect a first time position T1 at which this peak occurs. In a third step 33 microcontroller 129 processes the detection signal from second detector 128b to detect peaks and to detect the time positions T2(n) at which these peaks occur (n=1, 2, . . . being an index that distinguishes different peaks).

In a fourth step 34 microcontroller 129 determines values of the detection signal from third detector 128c at the time points of the peaks in the detection signal from second detector 128b. In an alternative embodiment microcontroller 129 processes the detection signal from third detector 128c to detect steps in this signal and to determine the time positions T3, if any, at which these steps occur and their step sizes.

Microcontroller 129 quantizes the values of the detection signal from third detector 128c at the time points of the peaks in the detection signal from second detector 128b and/or the step sizes, for example by rounding to a nearest integer multiple of a reference step value or size and determines a rank number V of the value or the number S of quantization levels spanned by the step. Quantizing means that a succession of value ranges of the detection signal and/or the step size can be distinguished, successive ranges corresponding to successive quantization levels. A measured detection signal and/or step size in the detection signal is assigned to the value range to which it belongs. Preferably all value ranges have the same size, but alternatively different ranges may have mutually different size. The size of the value range determines the quantization step size.

The size of each range preferably corresponds to the output change of the continuous output optical filter (first filter 126a) in one period of the periodic optical filter. In the case of quantized steps, the output change for a wavelength hop of N periods of the periodic optical filter lies in the centre of the value range to which the integer value of N is assigned. This applies for all values of N. But deviating range sizes may be used, as such deviations need not affect the measurement. If a deviating value range size is used in the case of quantized detection signals the value range size is preferably so small that the value range for the highest value of N in the sweep of tunable laser 122 is still within the same value range as when the sizes of the value ranges correspond exactly to one period of the periodic optical filter. If a deviating value range size is used in the case of quantized steps, the value range size is preferably so small that the value range for the value of N of the maximum possible mode hop of tunable laser 122 is still within the same value range as when the sizes of the value ranges correspond exactly to one period of the periodic optical filter.

Microcontroller 129 may be configured to calibrate the size of the quantization step to be applied to third detector 128c by means of the output of second detector 128b. To do so microcontroller 129 may be configured to determine a set of differences between the output signals of third detector 128c at the times of detection of the start of successive periods in the output of second detector 128c, and select the quantization step size on the basis of this set, for example by using the median difference value in the set, or an average, optionally an average obtained after eliminating differences that are affected by mode hops, as can be detected from the fact that they lie apart from the median or the differences in a majority of periods.

Figure 3A:
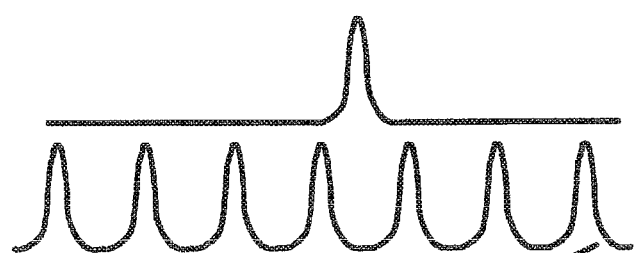
FIG. 3a illustrates detection signals
Figure 3B:
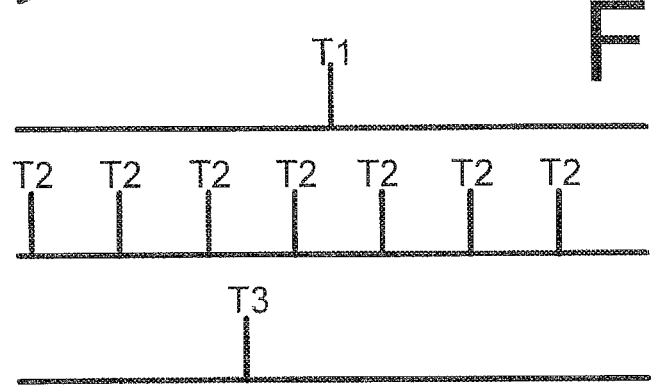
FIG. 3b illustrates the detected time points

FIG. 3a illustrates detection signals with peaks and steps. FIG. 3b illustrates the detected time points of the steps and peaks.

In a fifth step 35 microcontroller 129 computes a wavelength position of the peak detected by first detector 128 from the detected time position T1 of the peak.

When quantized detection values are used, this may be done by assigning a number N of the detected peaks in correspondence with the quantized value V of the detection signal from third detector 128c. When quantized steps are used, this may be done by counting the number N of detected peaks in the signal of second detector 128b from a start of the sweep and the time T1. Furthermore, in this case microcontroller 129 adds a sum P to account for detected steps in the detection signal from third detector 128c. The sum P is a sum of numbers S of quantization levels spanned by respective detected steps between the time of the start of the sweep and the time position T1 of the peak detected by first detector 128.

In addition an interpolation between peaks is made, by adding a fraction (T1−T2(i))/(T2(i+1)−T2(i)) to the number V or N+P. Herein "i" is the index of the peak in the detection signal from second detector 128b at the nearest lower time before or equal to T1. The resulting wavelength position W can be expressed as $W=V+(T1-T2(i))/(T2(i+1)-T2(i))$ when quantized detection signal values V are used, or $W=N+(T1-T2(i))/(T2(i+1)-T2(i))+\text{Sum } S$ When quantized step sizes S are used. During scanning, tunable laser may produce mode hops wherein the laser wavelength changes substantially discontinuously, stepping over a range of wavelengths. The correction by using quantized detection signals or adding the sum over S corrects for the effect of mode hops of tunable laser 122.

In a sixth step 36 microcontroller 129 outputs a sensor output signal derived from the resulting wavelength position W. The wavelength position W may be used for determining a sensed value, such as measured stress or temperature at fibre Bragg grating 102. The sensed value may be used for any purpose, such as driving a sensor display (not shown), as input to a signal processor (not shown) or as input to a control loop (not shown), with a comparator such as a differential amplifier having inputs coupled to receive an indication of the sensed value and a reference value and an output coupled to a driver that influences the environment (e.g stress or temperature) of fibre Bragg grating 102.

In another embodiment, microcontroller 129 applies interpolation after selecting between the nearest peak in the detection signal from second detector 128b before and the nearest peak after the peak in the detection signal from first detector 128a, dependent on detected mode hops. In this embodiment, fifth step 35 comprises a comparison of the time point T1 of the peak in the detection signal from first detector 128a and time points T3 of detected mode hops. The mode hops may be detected from steps in the detection signal from third detector 128c. Alternatively, or in addition, mode hops may be detected by detecting steps in the output of second detector 128b, in the case that a periodic first filter 126a is used that does not produce zero output in entire wavelength ranges of non-zero length. Use of second detector 128b generally results in larger, more easily detected steps even if the steps are smaller than a period. Additional use of third detector 128c has the advantage that hops of integer numbers of periods can be detected as well.

In this embodiment microcontroller 129 first determines the indices i, i+1 of the nearest peaks in the detection signal from second detector 128b with time points T2(i) and T2(i+1) before and after the time point T1 of the peak in the detection signal from first detector 128a. Next, microcontroller 129 determines whether a time point T3 of a step lies between these time points T2(i) and T2(i+1). If not, microcontroller 129 may proceed as described before. If T3 of a step lies between T2(i) and T2(i+1), microcontroller 129 determines whether the time point T1 of the peak in the detection signal from first detector 128a lies before or after the time point T3 of this step. If T1<T3, the resulting wavelength position W is computed according to $$W=M+(T1-T2(i))/(T2(i)-T2(i-1))$$

Where M=V or M=N+Sum S, dependent on whether quantized detection signals or quantized steps are used. If T1>T3, the resulting wavelength position W is computed according to $$W=M+(T1-T2(i+1))/(T2(i+2)-T2(i+1))$$

That is, the interpolation factor is either based on the time distance between a pair of peaks that lie both before the time point of the peak in the detection signal of first detector 128a, or the distance between a pair of peaks that lie both after that time point. In the interpolation, the fraction of the wavelength W that is associated with the time delay between T1 and the time position of the peaks the detection signal of second detector 128b is determined in inverse proportion to the selected time interval and proportional to the distance to the time point of the nearest peak of the selected pair.

In this way a correction for the fractional part of the wavelength change due to the mode jump in the interval containing the peak of the first signal is realized. In an embodiment this correction is applied also when the step is quantized to zero, provided that it exceeds a detection threshold. If more than one step occurs between T2(i) and T2(i+1), the corrections above may be applied possible if T1 is smaller than the time points T3 of all these steps, or bigger than all these time points T3.

Figure 4:
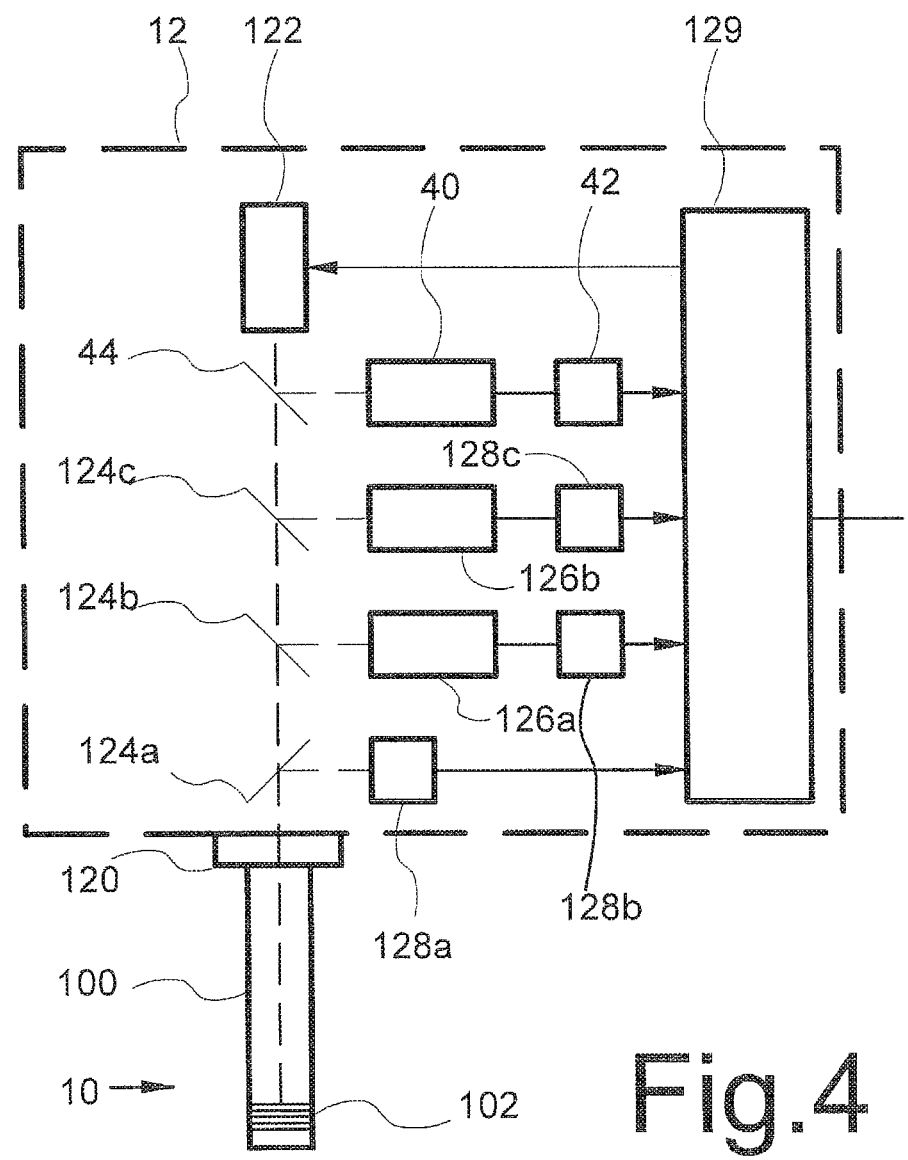
FIG. 4 shows a further optical measuring system

FIG. 4 shows a further embodiment. Compared to FIG. 1 a third filter 40 and a fourth detector 42 have been added, as well as a corresponding splitter 44. A light path from tunable laser 122 runs through third filter 40 to fourth detector 42. Fourth detector 42 has an output coupled to microcontroller 129. Third filter 40 is a resonant filter, with a single resonance peak in the sweep range or a comb filter, with fewer peaks in the sweep range than first filter 126a. In an embodiment a third filter 40 with one peak in the sweep range may be used. A filter comprising a fibre Bragg grating as selective element may be used for example, or a Fabry-Perot or resonator ring may be used for example. Third filter 40 is a high quality resonant filter, with higher quality than second filter 126b. The quality may be similar to that of first filter 126a.

In operation, third filter 40 serves to make the determination of the wavelength position independent of wavelength at the start of the sweep. In a first step 31 microcontroller 129 captures the time dependent output signals from fourth detector 42. A step is added wherein microcontroller 129 processes the detection signal from fourth detector 42 to detect a peak and to detect the time positions T4 at this peak occurs.

Fifth step 35 is changed in that microcontroller 129 may quantize the change of the value of the detection signal from third detector 128c between the time of the peak in the output signal from fourth detector 42 and the peak in the output signal from second detector 128b. Thus, a reference level for the output of third detector 128c is effectively calibrated by means of fourth detector 42. Alternatively microcontroller 129 may count the number N' of detected peaks in the signal of second detector 128b from T4 up to the peak indexed "i" in the signal from second detector 128b at the time position T2(i) that lies nearest before the time T1. When T4 occurs before the time T1 of the peak in the signal from first detector 128a, this counted number N' replaces the counted number N of the process of FIG. 3 in the determination of the resulting wavelength position W:

$$W=M+(T1-T2(i))/(T2(i+1)-T2(i))+\text{Sum } S$$

When T4 occurs after the time T1, N' is counted negatively:

$$W=-N'+(T1-T2(i))/(T2(i+1)-T2(i))+\text{Sum } S$$

When third filter 40 is comb filter with more than one peak in the sweep range, the first of these peaks from the start of the sweep may used to determine T4. Instead the j-th peak may be used, where j is any predetermined number. In this case, the optical path length in third filter is kept so low that the resonance order of the peak can be determined uniquely from its number in the order of peaks in the sweep (the resonance order is the ratio of the optical path length and the wavelength of the peak).

As in the preceding embodiment, a correction using a different pair of time points may be applied if a step occurs between T2(i) and T2(i+1).

In another embodiment a selection is made between a plurality of peaks of the third filter 40 in the sweep range. An implementation of third filter 40 as a comb filter is used in this case, the comb having a plurality of peaks in the sweep range. In this embodiment fifth step 35 is changed further in that microcontroller 129 determines the numbers of steps M1, M2 in the detection signal from third detector 128c and/or second detector 128b between the nearest peaks in the detection signal from fourth detector 42 before and after the peak in the detection signal from first detector 128a respectively. Microcontroller 129 then selects the peak in the detection signal from fourth detector 42 that has the lowest number of steps (or it selects the temporally closest peak in the detection signal from first detector 128a if the numbers M1 and M2 are equal). The counted number N' is then counted from the selected peak. The resulting wavelength position W is computed according to $$W=+/-N'+Q*D+(T1-T2(i))/(T2(i+1)-T2(i))+\text{Sum } S$$

Herein Q is the resonance order of the selected peak and D is the wavelength distance between successive resonance orders.

Figure 5:
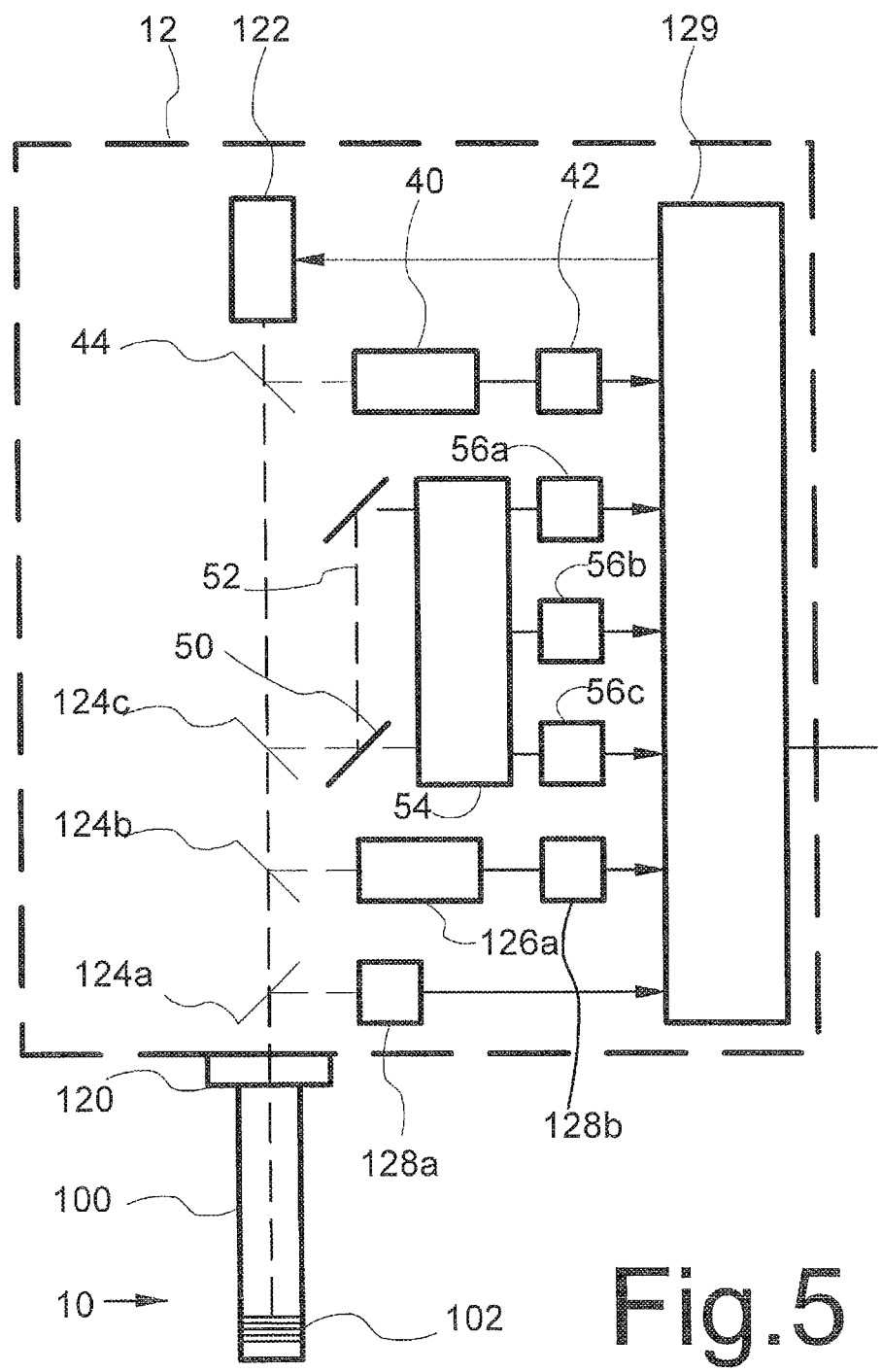
FIG. 5 shows an optical measuring system with a 3-way splitter

FIG. 5 shows an embodiment wherein the first filter and corresponding detector have been replaced by a splitter 50, an additional optical path 52, a three way coupler 54 and three further detectors 56a-c. Three way couplers are known per se from WO2004033987. Splitter 50 is located to receive light that derives from tunable laser 122. Splitter 50 has outputs coupled to respective inputs of three way coupler 54, via mutually different light paths that differ in length by additional optical path 52 (a third input (not shown) of three way coupler 54 receives no light). Three way coupler 54 has three outputs coupled to respective ones of further detectors 56a-c.

In operation, three way coupler 54 produces output light wherein input light is combined in mutually different phase relations. Light from the inputs is combined with zero degree, hundred and twenty degrees and two hundred forty degrees mutual phase shift at different outputs for example. Additionally, the input light at the different inputs has a mutual phase shift due to additional optical path 52. An expression for the amplitudes of the outputs is $$A1=B+C*\cos(PHI))$$

$$A2=B+C*\cos(PHI+120))$$

$$A3=B+C*\cos(PHI+240))$$

Herein PHI is the phase difference between the light from the mutually different light paths and B and C are constant factors.

Figure 6:
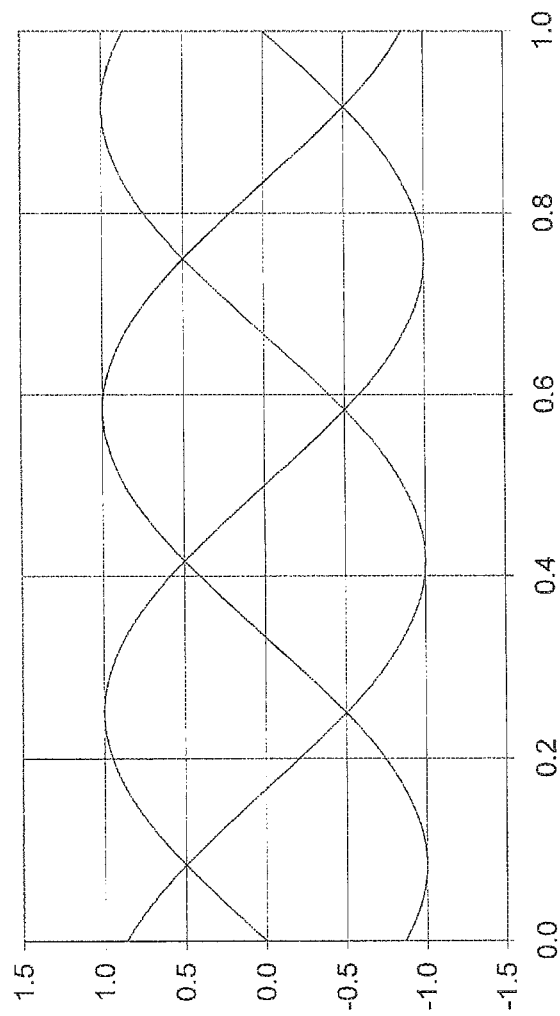
FIG. 6 illustrates light amplitudes at outputs of a 3-way splitter

FIG. 6 illustrates light intensity at the different outputs of three way coupler 54 as a function of wavelength. This phase shift "PHI" depends on wavelength in a periodical way: PHI=2*pi*L/lambda−m*2*pi, where m in an integer. As a result the light intensity at the different outputs of three way coupler 54 depends on wavelength in a periodical way, with mutual shifts between the wavelengths at which different outputs are minimal. A measured combination of output signals A1, A2, A3 at a given wavelength is sufficient to determine a relative phase of the signals at the inputs of three way coupler.

Absent mode hops, this would suffice to determine the wavelength difference between the wavelength at any time point and at a reference time point at the start of the sweep, or at detection of an amplitude peak in the output from third filter 40. This wavelength difference can be determined by determining the phase PHI at the time point from the detected amplitudes A1-A3 and counting the number N of periods in the outputs detected between the time point and a reference time point. Without hops, the following expression could be used for the wavelength difference D:

$$D=N+PHI$$

With $tg(PHI)=(A2-A3)/(A1-(A2+A3)/2)/\text{sqrt}(3)$.

However, when mode jumps occur, it cannot be determined from the outputs of three way coupler 54 whether the result of counting is reliable per se and therefore this particular computation of the wavelength difference D is not reliable. Microcontroller 129 is configured to use the output signal from third detector 128c to correct for this. Microcontroller 129 detects steps in the output signal from third detector 128c, quantizes the sizes of these steps and sums the quantized values of the step sizes. The result is an accumulated quantized step size Q. Microcontroller 129 is configured to compute the wavelength difference according to $$D=N+PHI+\text{Sum } S$$

Herein microcontroller 129 computes N by counting periods in the signal from at least one of further detectors 56a-c between a reference time point and a measurement time point for which the wavelength difference is computed, and PHI from the amplitudes detected by these detectors at the measurement time point. To this a sum of the spanned quantization levels S is added. Although use of an N-way coupler with N=3 has been shown, it should be appreciated that an N-way coupler may be used, with N greater than three. Such a coupler outputs combined light from a first and second input with respective different relative phase shifts at N respective outputs. Detection of the light intensity at N=3 or more outputs can be used to detect the phase relation between the light from the first and second input over a continuous phase range.

Although embodiments have been shown wherein the sensing device comprises a Bragg grating, it should be understood that alternatively other sensing devices with other optical structures can be used, such as a ring resonator or a resonant cavity, of which the resonance wavelength must be measured in a calibrated way.

Although an embodiment has been shown wherein second filter 126b is a resonant filter, it should be appreciated that instead an additional optical path, a three way coupler and three further detectors as in the embodiment of FIG. 5 may be used, but with a shorter additional optical path. This realizes a continuous filter transfer function to any one of the detectors, and it has the additional advantage that the microcomputer can handle mode hops between wavelengths on different sides of a peak in the filter output where the filter has equal response. The microcomputer may be configured to use phase values determined from a combination of output signals, as described for FIG. 5 and use them for the quantization.

Although embodiments have been described wherein the wavelength is determined for a single response in a wavelength sweep, such as the detected occurrence of a peak or dip in the reflection from a fibre Bragg grating, it should be appreciated that wavelengths may be determined for the time points of a plurality of responses, such as a continuous series of responses during a sweep, in order to determine reflection as a calibrated function of wavelength.

Although an embodiment has been described that uses a microcontroller 129 with a program of instructions to compute the wavelength in the way described, it should be appreciated that the computation can be performed in different ways. For example, raw data could be sent to a computer located outside measuring device 12, to perform the computation. In this case measuring device 12 need not contain a microcontroller. The computer located outside measuring device 12 may be a distributed computer system with a plurality of processors that each performs a respective different part of the computation. Instead of a microcontroller or a computer, specialized hardware may be used, designed to perform the computation. As used herein, the term "circuit configured to perform" specified actions will be used to refer to all of these embodiments as alternatives. A program for the computer or microcontroller may be provided on a computer program product, such as a computer readable disc (e.g. magnetic or optical) or a semiconductor memory or as modulation of a signal.

Although the embodiments have been explained using specific mathematical formulas, it should be appreciated that corresponding results can be computed without explicitly using the formulas. For example part of the terms in a formula can be computed incrementally, by adding an increment each time when a period is detected.

The invention claimed is:

1. An optical measuring device, for measuring a wavelength of a response from a sensing device, the optical measuring device comprising
    a light path coupled to an interface for coupling the light path to the sensing device;
    a periodic optical filter with an input coupled to the light path, to sample light that is supplied to or received from the sensing device;
    a first detector coupled to an output of the periodic optical filter;
    a continuous output optical filter with an input coupled the light path to sample light that is supplied to or received from the sensing device;

a second detector coupled to an output of the continuous output optical filter;

a computation circuit coupled to the first and second detector, and configured to process output signals from the first and second detector obtained during a wavelength scan of light supplied through the light path, using quantization of data derived from the second detector to identify a plurality of wavelengths, each associated with one of a plurality of respective time points at which the wavelength scan reaches corresponding positions in respective periods of the periodic optical filter, and to compute a wavelength associated with the response of the sensing device from the identified wavelengths on the basis of a time point of the response of the sensing device and at least a wavelength associated with a nearest lower or upper time point, selected from said plurality of respective time points, wherein said nearest lower time point or said nearest upper time point represents, respectively, (i) a time before or equal to the time point of the response of the sensing device or (ii) a time after or equal to the time point of the response of the sensing device.

2. An optical measuring device according to claim 1, wherein the computation circuit is configured to
use the output signal of the first detector to detect the respective time points, pairs of successive time points defining successive time intervals;
quantize the data derived from the second detector,
use the quantized data in the time intervals to identify said plurality of wavelengths, each associated with said one of the plurality of the respective time points, and
identify the wavelength associated with said nearest lower or upper the time point, said nearest lower or upper time point occurring at an edge of a time interval, selected from said successive time intervals, in which the response of the sensing device occurs.

3. An optical measuring device according to claim 2, wherein the computation circuit is configured to compute the wavelength associated with the response of the sensing device by adding a fraction to a wavelength associated with said nearest lower or upper time points at said edge of the time interval, the fraction being selected in proportion to a ratio between a distance from the time point of the response of the sensing device to said nearest lower or upper time point, and a duration of the time interval or a further time interval, between said nearest lower or upper time point and a further time point at the edge of the time interval or the further time interval, wherein the wavelength associated with the response of the sensing device is an interpolated wavelength.

4. An optical measuring device according to claim 3, wherein the computation circuit is configured to select said nearest lower or upper time point and said time interval or further time interval dependent on a detected step in the output of the first and/or second detector, said nearest lower or upper time point and said time interval or further time interval being selected on opposite sides of a time of the detected step relative to the time point of the response of the sensing device.

5. An optical measuring device according to claim 1, wherein the computation circuit is configured to quantize the output signal of the second detector and to identify said plurality of wavelengths, each associated with said one of the plurality of the respective time points by quantized output signal values for said respective time points.

6. An optical measuring device according to claim 5, comprising
a resonant optical filter with an input coupled to the light path, to sample light that is supplied to or received from the sensing device, the resonant optical filter having at least one resonance wavelength and, if more than one resonance wavelength, resonance wavelength spaced apart by at least a plurality of wavelength period sizes of the periodic optical filter;
a third detector coupled to an output of the resonant optical filter; wherein
the computation circuit is coupled to the third detector, and configured to quantize a difference between the output signal of the second detector at a reference time point at which a peak of the output signal of the third detector is detected and said respective time points.

7. An optical measuring device according to claim 1, wherein the computation circuit is configured to provide a count of time intervals detected by the first detector between the time point of the response of the sensing device and a reference time point, to identify at least one step in the output of the second detector between the time point of the response and the reference time point, to quantize the step and to change the count dependent on a number of quantization levels in a quantized value of the step.

8. An optical measuring device according to claim 7, comprising
a resonant optical filter with an input coupled to the light path, to sample light that is supplied to or received from the sensing device, the resonant optical filter having at least one resonance wavelength and, if more than one resonance wavelength, resonance wavelengths spaced apart by at least a plurality of wavelength period sizes of the periodic optical filter;
a third detector coupled to an output of the resonant optical filter; wherein
the computation circuit is coupled to the third detector, and configured to select the reference time point in response to detection of a resonance peak by the third detector.

9. An optical measuring device according to claim 8, wherein the resonant optical filter has a first and second resonance wavelength, the computation circuit being configured to determine a first and second number of steps in the output of the second detector between said time point of the response of the sensing device and first and second time points of detecting the first and second resonance wavelengths by the third detector, and to select the first or second time points as the reference time point, according to whether the first or second number is smaller respectively.

10. An optical measuring device according to claim 9, wherein the computation circuit is configured to determine said count from detected periods between the reference time point and said time point of the response of the sensing device to add a sum of numbers of quantization levels in the quantized values of a plurality of said steps detected between said reference time point and said time point of the response of the sensing device.

11. An optical measuring device according to claim 7, wherein the periodic optical filter comprises
a splitter with an input coupled to the light path,
a first and second further light path of mutually different length, with inputs coupled to respective outputs of the splitter, the lengths determining a period of the periodic optical filter;
an N-way coupler with inputs coupled to outputs of the first and second further light path, where N is at least three, the N-way coupler being configured to output combination of light from the first and second further light path with mutually different relative phase shifts on N outputs, N further detectors, including said first detector, coupled to respective ones of the outputs of the N-way coupler, and wherein the computation circuit is configured to determine a phase relation between the light at the outputs of the first and second further light path from the output signals for the N further detectors, and to add a fraction to said count according to a shift of the phase relation from a start of one of the periods, wherein the wavelength associated with the response of the sensing device is an interpolated wavelength.

12. An optical measuring device according to claim 1 comprising a tunable laser coupled to the light path to supply said light.

13. An optical measuring device according to claim 1 comprising a wavelength scannable light source to supply said light; and a sensing detector coupled to the light path for receiving light from the sensing device, the computation circuit being coupled to the sensing detector and configured to determine said time point of the response of the sensing device from a time at which the sensing detector detects a peak or dip in a response from the sensing device to the light.

14. An optical measuring device according to claim 1 comprising said sensing device coupled to the interface, wherein the sensing device is an optical fibre comprising a Bragg grating.

15. A method of measuring a wavelength of a response from a sensing device, the method comprising supplying light to the sensing device in a wavelength scan with time varying wavelength;

detecting a first response of a periodic optical filter to a first sample of the light as a function of time;

using an output signal of a first detector to detect respective time points at which the scan reaches corresponding positions in respective periods of the periodic optical filter, pairs of successive time points defining time intervals;

detecting a second response of a continuous output optical filter to a second sample of the light as a function of time;

using quantization of data derived from a second detector to identify a plurality of wavelengths, each associated with one of a plurality of the respective time points;

computing a wavelength associated with the response of the sensing device from the identified wavelengths on the basis of a time point of the response of the sensing device and at least a wavelength associated with a nearest lower or upper time point, selected from said plurality of respective time points, wherein said nearest lower time point or said nearest upper time point represents, respectively, (i) a time before or equal to the time point of the response of the sensing device or (ii) a time after or equal to the time point of the response of the sensing device.

* * * * *